Sept. 22, 1959  R. H. GILBERT  2,905,431
VALVE
Filed Sept. 11, 1953  2 Sheets-Sheet 1
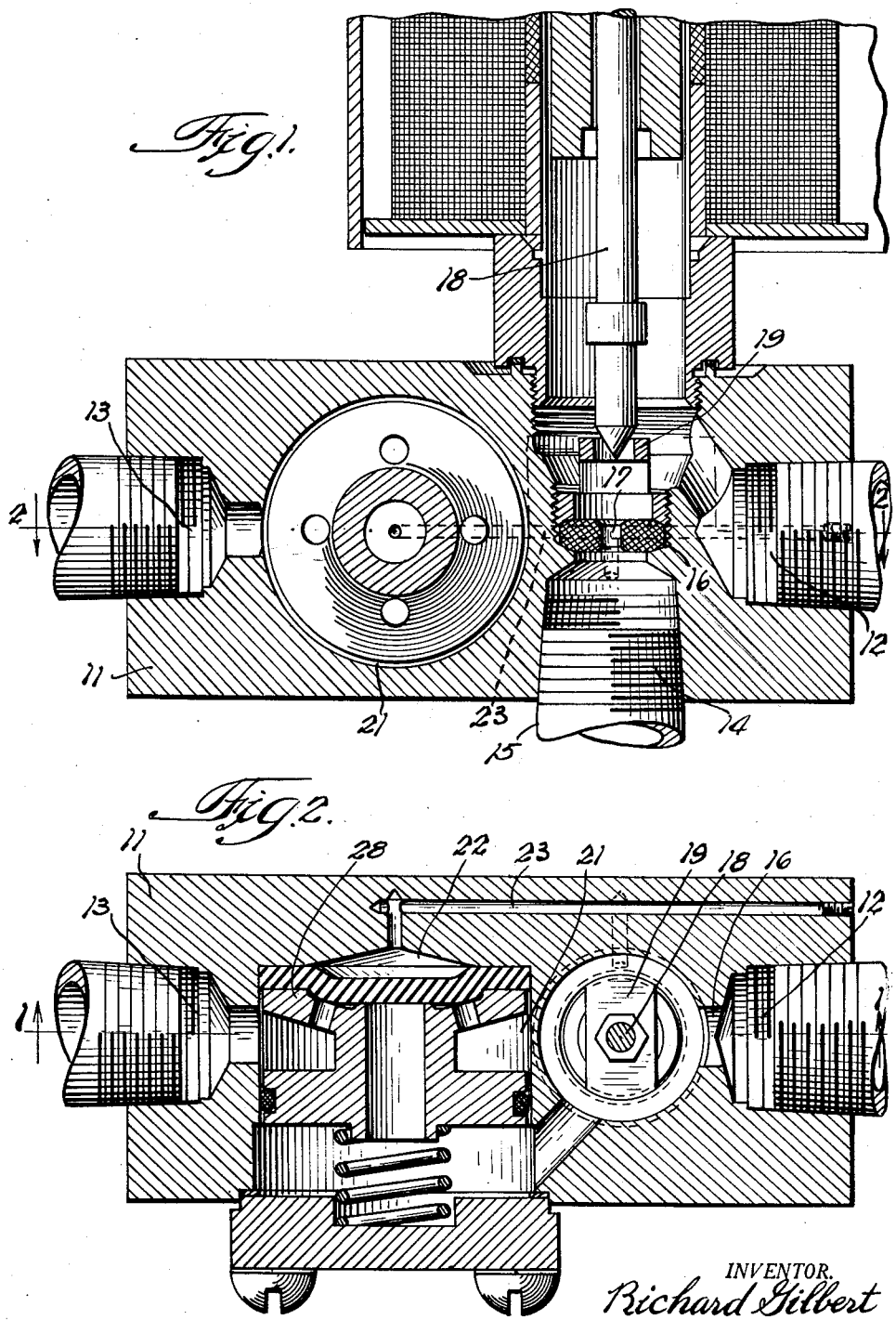
INVENTOR.
Richard Gilbert
BY.

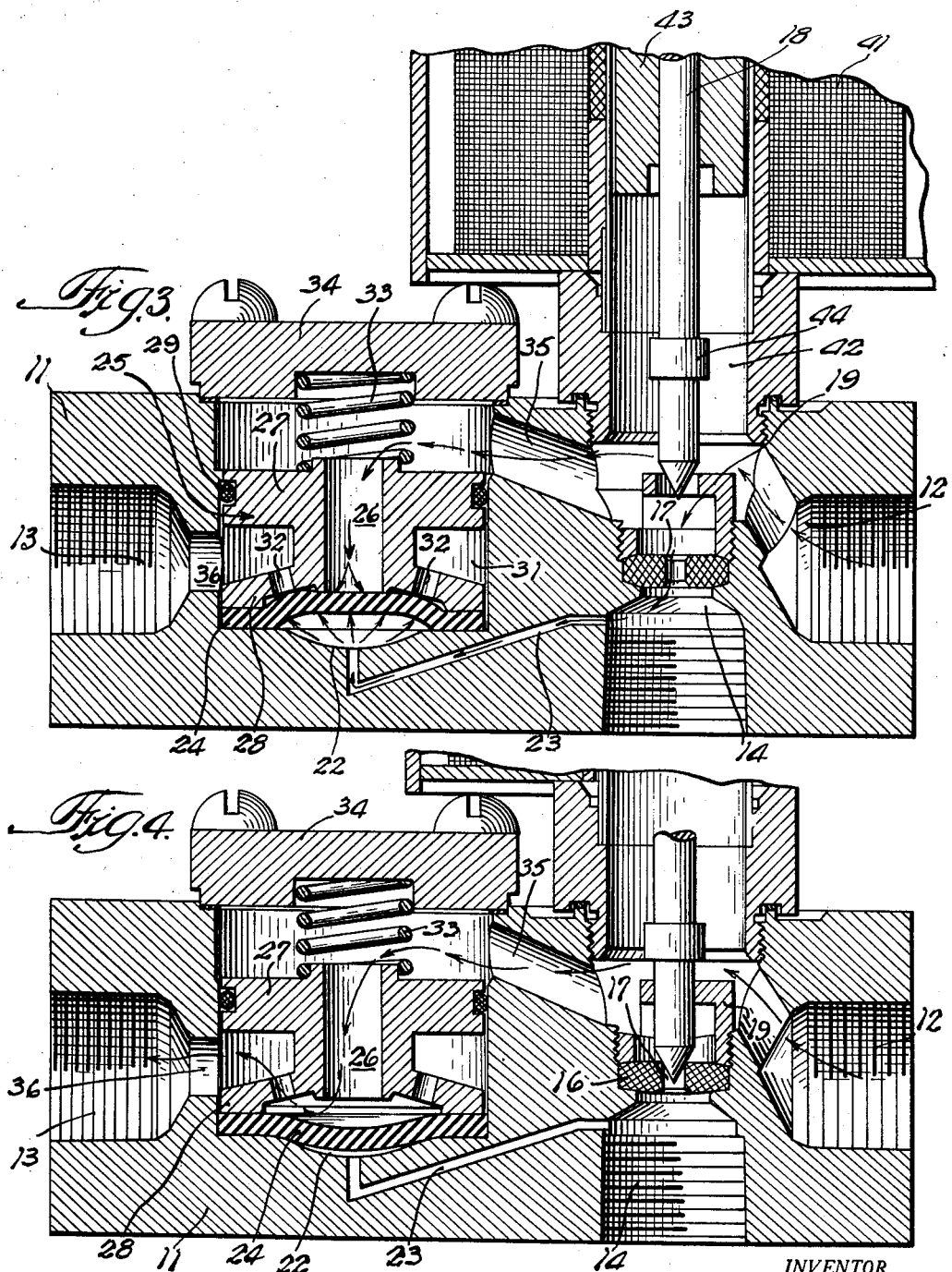

2,905,431
VALVE

Richard H. Gilbert, Oak Park, Ill., assignor to Jas. P. Marsh Corporation, Skokie, Ill., a corporation of Illinois Application September 11, 1953, Serial No. 379,506

6 Claims. (Cl. 251—61)

The present invention relates to a valve and has special reference to a three-way valve for controlling the flow of fluid in a system having a by-pass.

In many systems which intermittently supply a fluid for operation, it is desirable to use a continuously operating pump and by-pass the fluid except when it is required. Such a system is particularly advantageous where the intermittent use of the fluid is frequent and for relatively short periods of time, such as in a supply system for an oil burner employed to maintain a constant temperature within very close limits. While the present valve is shown as being controlled by a solenoid, any other desirable means may also be used for this purpose.

The present valve receives fluid from a continuously operating pump or other source of fluid under pressure and acts automatically to direct the fluid either through an operating passageway to a unit to be operated, or to a by-pass passageway which is open only when the operating passageway is closed.

An object of the present invention is to provide a by-pass valve.

Another object is to provide a by-pass valve for use in a system supplied from a continuously operating pump or other pressure source, for the by-pass of the fluid when it is not required.

Still another object is to provide a by-pass valve that may be employed in systems, such as an oil burner system, to maintain a constant condition, such as a temperature, within very close limits.

A still further object of the invention is to provide a diaphragm valve construction having wide application.

Further objects and advantages will be apparent from the following description and claims when considered together with the accompanying drawings, in which:

Fig. 1 is a central vertical cross sectional view of a by-pass valve embodying the present invention taken on the line 1—1 of Fig. 2;

Fig. 2 is a cross sectional view taken on the line 2—2 of Fig. 1;

Fig. 3 is a view of a modified form of valve similar to that shown in Figs. 1 and 2 with parts thereof rearranged to diagrammatically illustrate the flow therethrough; and Fig. 4 is a view similar to Fig. 3 with certain parts in changed position and the by-pass passageway open.

Referring more particularly to the drawings there is shown a by-pass valve embodying the present invention comprising a body 11 having an inlet 12 at one end for connection to a fluid pressure supply line such as from a continuously operating pump, and an outlet 13 at the opposite end of the body for connection to a line for returning the by-passed fluid to the pump or to a reservoir.

Communicating with the inlet 12 is an operating passageway 14 which may be arranged vertically in the body 11 and at right angles to the inlet 12. The operating passageway 14 is intended to be connected to an operating line such as the fuel supply line of an oil burner. Also communicating with the inlet 12 is a by-pass passageway terminating in the outlet 13.

A needle valve unit is preferably employed to control the flow of fluid from the inlet 12 to the operating passageway 14. This valve unit may comprise a valve seat 16 positioned just above a restricted portion adjacent the upper end of the operating passageway 14 and having a valve opening 17 therein. The lower pointed end of a vertically reciprocable stem 18 opens and closes the opening 17. When the valve stem 18 is in its upper position shown in Figs. 1 and 3 the needle valve unit is open and fluid entering through the inlet 12 may pass downwardly through the valve opening 17 into the passageway 14. In the lower position of the valve stem 18 the pointed end fits into the seat 16, thereby closing off the opening 17 and preventing any further flow of fluid from the inlet 12 into the operating passageway 14. A seat cage 19 positioned above the valve seat 16 serves to guide the lower end of the valve stem 18.

The by-pass passageway includes a cylindrical chamber 21 extending inwardly from one side of the body 11 and communicating with both the inlet 12 and outlet 13. The chamber 21 is preferably cylindrical but may be of any other suitable shape.

The axis of the chamber 21 may be at right angles to the axis of both the inlet and outlet and the operating passageway 14, or it may be parallel to the latter as shown in Figs. 3 and 4. The arrangement shown in Figs. 1 and 2 makes possible a more compact valve with shorter passages that may be more readily formed in the body, but the operation is the same as in the form of valve illustrated in Figs. 3 and 4. The inner end of the chamber 21 is dished except adjacent the sides as illustrated at 22 and is connected to the operating line 14 beyond the valve seat 16 by a channel 23.

A diaphragm valve unit is positioned in the chamber 21. This unit may comprise a diaphragm 24 for being placed at the inner end of the chamber 21. The periphery of the diagram 24 is held tightly against the inner end of the chamber 21 outwardly of the dished portion 22 thereof by a pressure spool 25 designed to fit in the chamber 21 whether the chamber is round or of other shape in cross section.

The pressure spool 25 has a flange 27 adjacent the outer end thereof and a flange 28 adjacent the inner end with an annular groove 31 between the flanges. An O-ring 29 is positioned in a peripheral groove of the outer flange 27 for forming a tight seal between the flange and the adjacent chamber wall. A central longitudinal opening 26 extends through the spool, and the inner end of the spool adjacent the opening 26 is made concave to form with dished end 22 a space for movement of the diaphragm 24. The annular groove 31 between the inner and outer flanges communicates with the inner concave end of the spool by bores 32. The spool is held in its inner position by a spring 33 located between a removable cap 34 and the outer end of the spool 25 with the peripheral portion of the inner flange 28 pressing the periphery of the diaphragm tightly against the bottom of the chamber 21. The cap 34 also closes the outer end of the chamber.

In addition to the chamber 21 the by-pass passageway comprises the channels 35 and 36. The channel 35 connects the end of the chamber 21 outwardly of the flange 27 with the inlet 12, and the channel 36 connects the annular groove 31 with the outlet 13.

The present valve is so arranged that fluid entering the inlet 12 will be directed either through the operating passageway 14 or the by-pass passageway, depending upon the position of the valve stem 18 and the diaphragm 24. With the valve stem 18 in raised or open position as shown in Figs. 1 and 3, fluid from the inlet 12 will flow through the opening 17 in the valve seat 16 into the passageway 14 from which it will be directed to the operating unit, such as the nozzle of an oil burner. The flow of fluid into the operating passageway 14 will build up pressure therein and cause the fluid to flow through the channel 23 to the space below the diaphragm 24. As the area of the diaphragm effected by the fluid beneath the same is greater than the area of the opening 26, the diaphragm 24 will be forced against the lower end of the spool 25, thus closing off the opening 26 and the by-pass passageway. When the stem 18 is lowered to closed position shown in Fig. 4 the opening 17 in the valve seat 16 is closed and further flow of fluid into the passageway 14 is prevented. Thereupon pressure in the operating line 14 and channel 23 drops, permitting the pressure of the fluid in the spool opening 26 to force the diaphragm 24 to its lower position. This permits the fluid entering the top of the chamber 21 through the channel 35 to flow downwardly through the opening 26 in the spool to the space above the diaphragm 24 and then through the bores 32 to the annular opening 31 from which it escapes through the channel 36 to the outlet 13.

The fluid, therefore, is by-passed so long as the valve stem 18 is in closed position. However, as soon as the stem 18 is raised to open the valve seat 16 the by-pass passageway is automatically closed.

The movement of the valve stem 18 may be controlled by any suitable means such as a solenoid, as illustrated in Figs. 1 and 3. This may comprise the usual winding 41 which may be connected to a source of current by a thermostatically controlled switch. The valve stem 18 is positioned for reciprocation in the chamber 42 which is closed except at the lower end where it communicates with the inlet 12, so is constantly filled with fluid entering the valve through the inlet. Positioned about the stem 18 for sliding movement thereon between a lower collar 44 and an upper collar on the stem is a core 43 which has a diameter somewhat less than the diameter of the casing 42. With this construction the stem 18 is biased to closed position by gravity and is moved to open position by movement of the core upwardly when the coil 41 is energized. The fluid in the chamber 42 damps the movement of the core 43.

While particular embodiments of this invention have been illustrated and described it will be understood, of course, that the invention is not to be limited thereto, since many modifications may be made and it is contemplated therefore by the appended claims to cover any modifications as fall within the true spirit and scope of this invention.

I claim:

1. A diaphragm valve comprising a body having a chamber therein, a flexible diaphragm at the inner end of said chamber, a spool having a longitudinal opening therethrough and flanges adjacent opposite ends with a peripheral groove therebetween, said spool being positioned in said chamber and having its inner flange engaging the peripheral portion of said diaphragm, means urging said spool against said diaphragm, said inner flange having passages connecting the inner end of said spool with said peripheral groove, a supply port and a discharge port communicating with said chamber, one of said ports connecting with said longitudinal opening and the other with said peripheral groove.

2. A diaphragm valve comprising a body having a chamber therein, a flexible diaphragm at the inner end of said chamber, a spool having a longitudinal opening therethrough and flanges adjacent opposite ends with a peripheral groove therebetween, said spool having its inner end concave about said opening with the inner flange engaging the peripheral portion of said diaphragm, said inner flange having passages connecting the inner concave end of said spool and said peripheral groove, a supply port and a discharge port communicating with said chamber, one of said ports communicating with said longitudinal opening at the outer end of said spool and the other with said peripheral groove.

3. A diaphragm valve comprising a body having a chamber therein with the inner end thereof dished, a flexible diaphragm at the inner end of said chamber, a spool having a longitudinal opening therethrough and flanges adjacent opposite ends with a peripheral groove therebetween, said spool having its inner end concave about said opening with the inner flange engaging the peripheral portion of said diaphragm, said inner flange having passages connecting the inner concave end of said spool and said peripheral groove, a supply port and a discharge port communicating with said chamber, one of said ports communicating with said longitudinal opening at the outer end of said spool and the other with said peripheral groove.

4. A diaphragm valve comprising a body having a chamber therein, a flexible diaphragm at the inner end of said chamber, a spool having a longitudinal opening therethrough and flanges adjacent opposite ends with a peripheral groove therebetween, said spool having its inner end concave about said opening with the inner flange engaging the peripheral portion of said diaphragm, said inner flange having passages connecting the inner concave end of said spool and said peripheral groove, a supply port and a discharge port communicating with said chamber, one of said ports communicating with said longitudinal opening at the outer end of said spool and the other with said peripheral groove, and means providing for supply of pressure fluid to one side of said diaphragm for urging said diaphragm against the inner end of said longitudinal opening to close the same.

5. A diaphragm valve comprising a body having a chamber therein, a flexible diaphragm at the inner end of said chamber, a spool having a longitudinal opening therethrough and flanges adjacent opposite ends with a peripheral groove therebetween, said spool having its inner end concave about said opening with the inner flange engaging the peripheral portion of said diaphragm, said inner flange having passages connecting the inner concave end of said spool and said peripheral groove, a supply port and a discharge port communicating with said chamber, one of said ports communicating with said longitudinal opening at the outer end of said spool and the other with said peripheral groove, and a pressure supply line communicating with the inner end of said chamber to move said diaphragm against the inner end of said longitudinal opening to close the same.

6. A diaphragm valve comprising a body having a chamber therein, a flexible diaphragm at the inner end of said chamber, a spool having a longitudinal opening therethrough and a peripheral flange at its inner end positioned in said chamber, said spool having its peripheral flange engaging the peripheral portion of said diaphragm and having a passageway connecting the inner end of said spool with the periphery of said spool intermediate its ends, means urging said spool against said diaphragm, a supply port and a discharge port, one of said ports connecting with said longitudinal opening and the other with said passageway.

References Cited in the file of this patent

UNITED STATES PATENTS

| | | |
|---|---|---|
| 608,955 | Davey | Aug. 9, 1898 |
| 1,269,721 | Kuntny | June 18, 1918 |
| 1,496,935 | Lemmon | June 10, 1924 |
| 1,804,751 | Doble | May 12, 1931 |
| 1,871,535 | Lattner | Aug. 16, 1932 |
| 1,888,866 | Russel | Nov. 22, 1932 |
| 1,964,921 | Lundberg | July 3, 1934 |
| 2,193,075 | Osborne | Mar. 12, 1940 |
| 2,257,249 | Thomas | Sept. 30, 1941 |
| 2,295,208 | Grove | Sept. 8, 1942 |
| 2,531,824 | Paille | Nov. 28, 1950 |
| 2,649,688 | Slomer | Aug. 25, 1953 |
| 2,677,390 | Davis | May 4, 1954 |
| 2,696,828 | Husing | Dec. 14, 1954 |